(12) United States Patent
Wang et al.

(10) Patent No.: US 6,182,985 B1
(45) Date of Patent: Feb. 6, 2001

(54) RESTORING DEVICE OF A FRAME FOR A SKATEBOARD

(76) Inventors: Leao Wang; Peter Wu, both of No 1, Lane 233, Sec. 2, Chargn Long Rd., Taiping 411 (TW)

( * ) Notice: Under 35 U.S.C. 154(b), the term of this patent shall be extended for 0 days.

(21) Appl. No.: 09/586,920

(22) Filed: Jun. 5, 2000

Related U.S. Application Data

(63) Continuation-in-part of application No. 09/517,335, filed on Mar. 2, 2000.

(51) Int. Cl.[7] ................................................ B62M 1/00
(52) U.S. Cl. ............................ 280/87.041; 280/87.042
(58) Field of Search ....................... 280/87.041, 87.042, 280/87.05, 38, 47.19, 47.34, 47.35, 11.23

(56) References Cited

U.S. PATENT DOCUMENTS

| | | | | |
|---|---|---|---|---|
| 1,637,129 | * | 7/1927 | Pritchet | 280/87.041 |
| 1,706,048 | * | 3/1929 | Van De Mark | 286/87.041 |
| 4,552,372 | * | 11/1985 | Jones | 280/87.041 |
| 5,165,711 | * | 11/1992 | Tsai | 280/87.041 |
| 5,820,146 | * | 10/1998 | Van Ligten | 280/87.041 |
| 5,954,349 | * | 9/1999 | Rutzel | 280/87.041 |

FOREIGN PATENT DOCUMENTS

0590809 * 6/1925 (FR) ................................. 280/87.041

* cited by examiner

Primary Examiner—Richard M. Camby

(57) ABSTRACT

The present invention relates to a restoring device of a frame for a skateboard comprising a height-adjustable handgrip at the top of a front supporting bar which is attached with a main frame, a locating member being pivoted with the main frame so that, when the front supporting bar is moved by the handgrip to perform a right and left turning, the main frame will create a side-sloping action in order to achieve the wheel-turning effect. The improvement is characterized in that an axle sleeve and a soft packing ring are inserted into an axial through hole at the top of the locating member in order to hinge with a pivot of the main frame so that the main frame automatically restores itself by means of the soft packing ring after the side-sloping force disappears.

2 Claims, 3 Drawing Sheets

US 6,182,985 B1

RESTORING DEVICE OF A FRAME FOR A SKATEBOARD

Continuation-in-part of Ser. No. 09/517,335, Mar. 2, 2000.

BACKGROUND OF THE INVENTION

The present invention is a continuation-in-part of U.S. patent application Ser. No. 09/517,335, filed Mar. 2, 2000.

1. Field of the Invention

The present invention relates to a steering device of a skateboard, and more particularly, to a restoring device of a frame for a skateboard by means of a soft packing ring.

2. Description of the Prior Art

The steering device of a broadly used conventional skateboard is structurally the same to that of bicycles or cars, that is, they make use of turning the handle or the steering wheel to enable the coupled wheel assembly to carry out a direct direction-turning movement. Though this is a very common technique and can reach the steering effect, it's uneasy to hold the handgrip 10 with one hand in turning the direction, especially for the beginner or the user unfamiliar therewith, because it is an exercise apparatus (or called toy) with small volume. An excessive or insufficient turning movement is easily caused.

SUMMARY OF THE INVENTION

It is a main object of the present invention to provide a restoring device of a frame for a skateboard wherein the steering device makes use of the right or left shift of the steering handle or the body gravity of the users to reach a simultaneous side-sloping effect so that the wheels can be easily turned. In addition, a soft packing ring can be used to restore the frame when the side-sloping external force disappears.

BRIEF DESCRIPTION OF THE DRAWINGS

The accomplishment of this and other objects of the invention will become apparent from the following description and its accompanying drawing of which.

DETAILED DESCRIPTION OF THE PREFERRED EMBODIMENT

Figure 1:
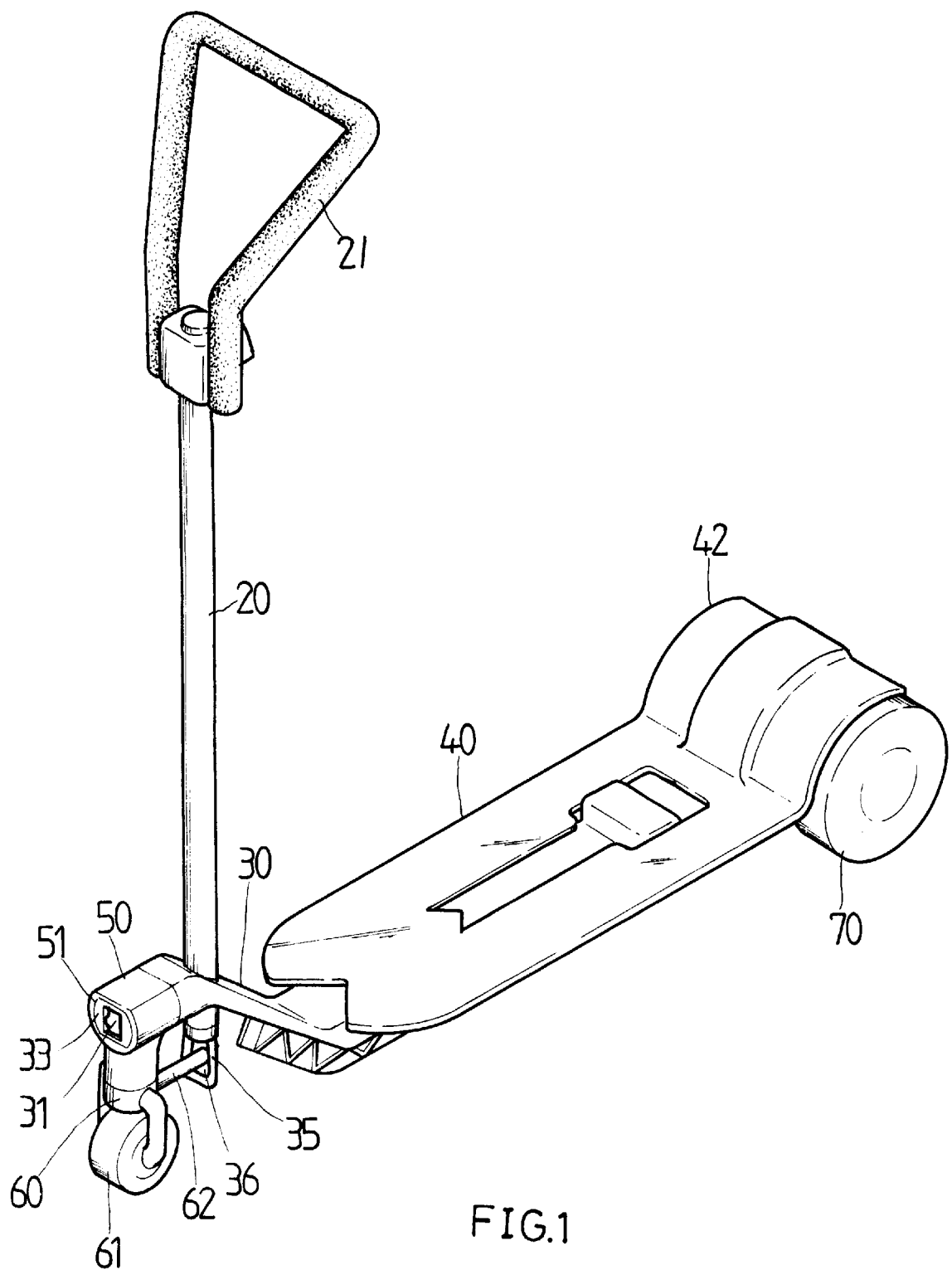
FIG. 1 is a perspective view of a preferred assembled embodiment of the present invention.
Figure 2:
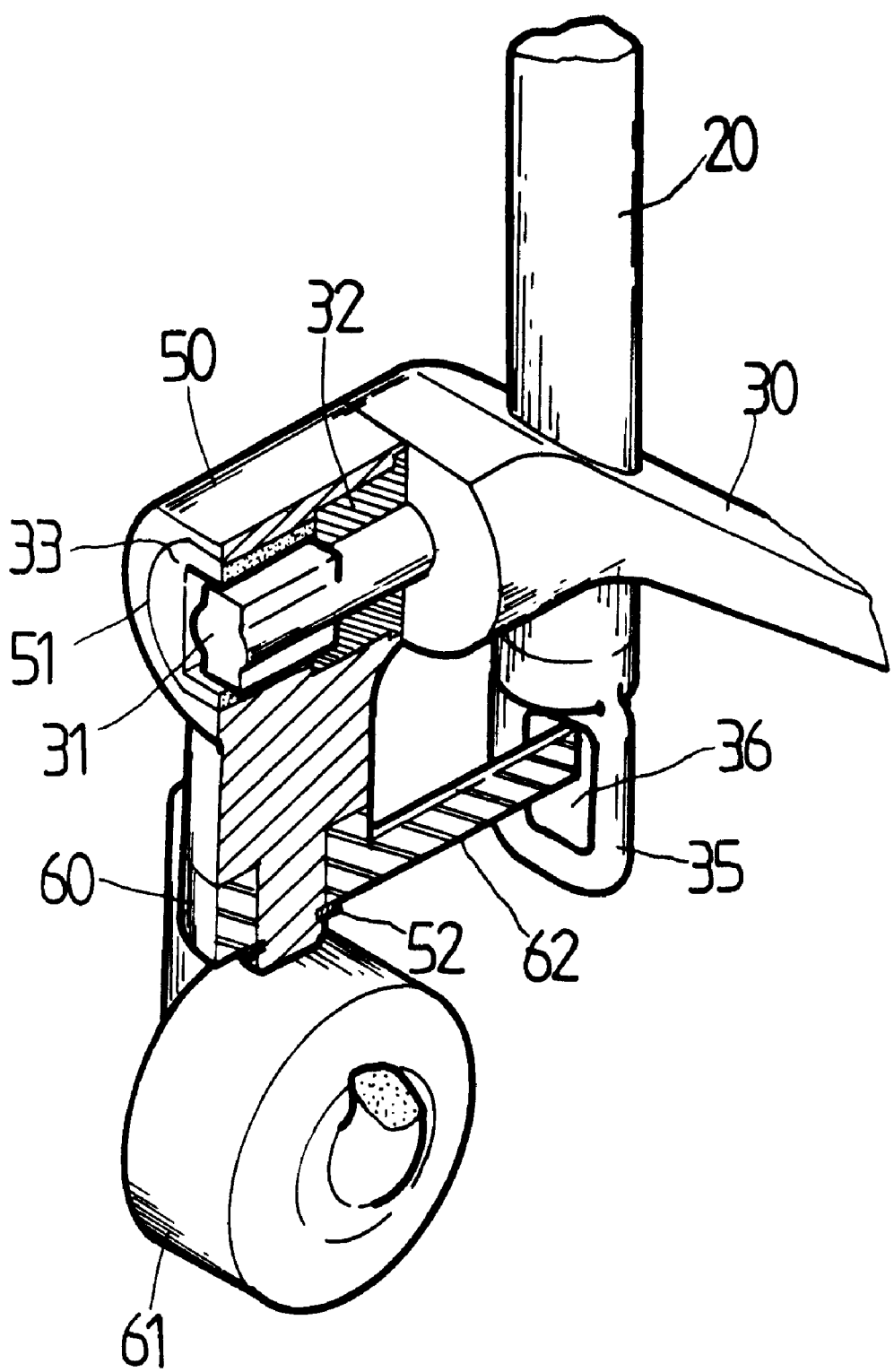
FIG. 2 is a partial view in section of FIG. 1.

First of all, referring to FIGS. 1 and 2, they show a preferred embodiment of the present invention which includes the following basic components:

a front supporting bar 20 having a handgrip 21 at the top thereof while the bottom thereof is connected with a main frame 30;

a main frame 30 having a pivot 31 at front end thereof, said main frame 30 being hinged with a ring-shaped piece 35 near a locating member 50 at the bottom end thereof;

a deck 40 placed upon said main frame 30, a tail 42 being raised and covering the top ol a rear wheel assembly 70, a proper clearance being kept between said tail 42 and said rear wheel assembly 70;

a locating member 50 having an axial through hole 51 for receiving an axle sleeve 32 and a soft packing ring 33 in order to hinge with said pivot 31 of said main frame 30, while the bottom end thereof being hinged with an axle shaft sleeve 60 by means of a fastener 52;

an axle shaft sleeve 60 being connected with a front wheel assembly 61 at the bottom end thereof, said axle shaft sleeve 60 having an extension rod 62 disposed at one side thereof and extending in the direction of said main frame 30, said extension rod 62 entering into a ring hole 36 of said ring-shaped piece 35; and a rear wheel assembly 70.

After assembly of the foregoing components, as shown in FIGS. 4 and 5, when the front supporting bar 20 is turned by the handgrip 21 to the right and the left direction, the main frame 30 will be made in a sloping state. Furthermore, the ring-shaped piece 35 pivoted at the bottom of the main frame 30 moves the extension rod 62 of the axle shaft sleeve 60, wherein the top end of the axle shaft sleeve 60 is pivoted with the locating member 50 while the bottom end thereof is coupled with the front wheel assembly 61. Therefore, when the extension rod 62 is turned, the axle shaft sleeve 60 will be turned together so that the turning effect of the front wheel assembly 61 is achieved.

Of course, the user can use the shift of the center of body gravity to reach the direction-turning effect.

The soft packing ring 33 plugged into the axial through hole 51 of the locating member 50 is used to restore the pivot 31 by means of the resilient force when the external force disappears after the pivot 31 is squashed.

Figure 3:
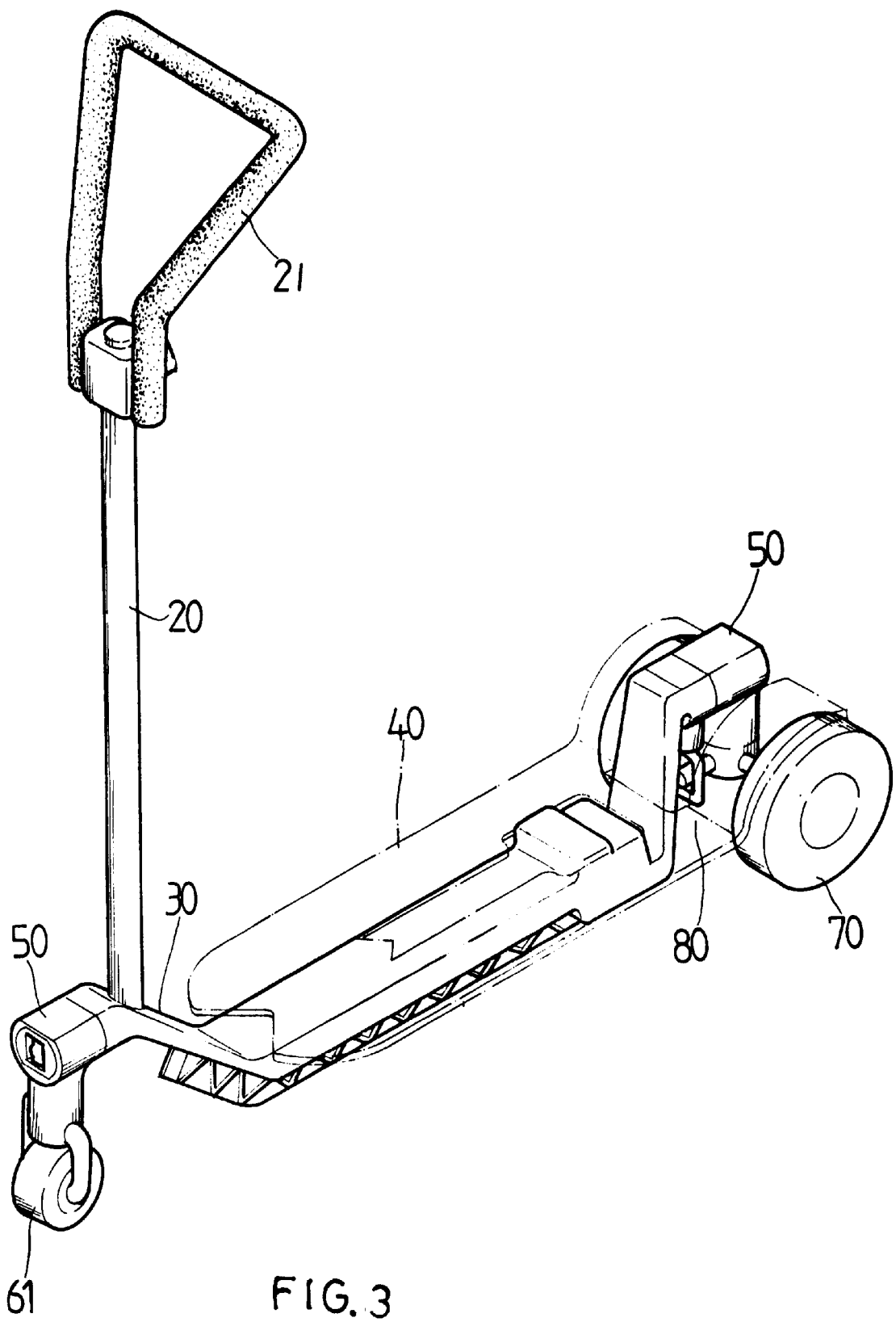
FIG. 3 is a perspective view of another preferred assembled embodiment of the present invention.

Thereafter, in another preferred embodiment as shown in FIG. 3, the front and rear end of the main frame 30 can be fitted with a pivot 31. In coordination with a locating member 50 and an axle shaft sleeve 60 can a pivoting effect achieved. Also, the main frame automatically restores itself by means of a soft packing ring after the side-sloping force disappears.

Many changes and modifications in the above-described embodiments of the invention can, of course, be carried out without departing from the scope thereof. Accordingly, to promote the progress in science and the useful arts, the invention is disclosed and is intended to be limited only by the scope of the appended claims.

What is claimed is:

1. A restoring device of a frame for a skateboard comprising a height-adjustable handgrip at the top of a front supporting bar which is attached with a main frame, a locating member being pivoted with said main frame so that, when the front supporting bar is moved by said handgrip to perform a right and left turning, said main frame will create a side-sloping action in order to achieve the wheel-turning effect, wherein the improvement is characterized in that an axle sleeve and a soft packing ring are inserted into an axial through hole at the top of said locating member in order to hinge with a pivot of said main frame so that said main frame automatically restores itself by means of said soft packing ring after the side-sloping force disappears.

2. A restoring device of a frame for a skateboard comprising a height-adjustable handgrip at the top of a front supporting bar which is attached with a main frame, a locating member being pivoted at the front and rear ends of said main frame respectively so that, when the front supporting bar is moved by said handgrip to perform a right and left turning, said main frame will create a side-sloping action in order to achieve the wheel-turning effect, wherein the improvement is characterized in that an axle sleeve and a soft packing ring are inserted into an axial through hole at the top of each of said locating members in order to hinge with a pivot of said main frame so that said main frame automatically restores itself by means of said soft packing ring after the side-sloping force disappears.

* * * * *